Nov. 13, 1923. 1,473,988
J. A. GOODSELL ET AL
MECHANISM FOR CONNECTING THE SPEEDOMETER WITH THE POWER SHAFT
OF A MOTOR VEHICLE
Filed Oct. 30. 1922 2 Sheets-Sheet 1
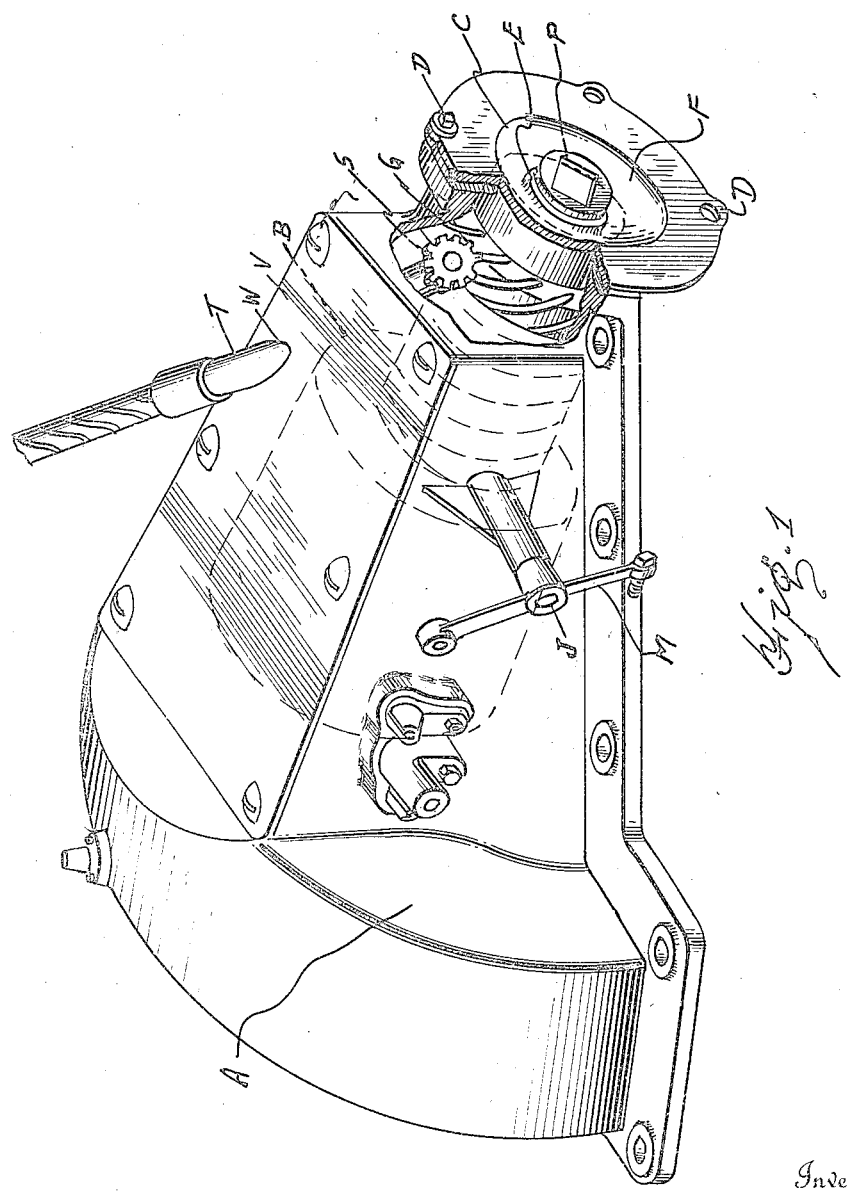
Inventors
James Arthur Goodsell
Starr A. Dovey
By William M. Ewan
Attorney Nov. 13, 1923. 1,473,988
J. A. GOODSELL ET AL
MECHANISM FOR CONNECTING THE SPEEDOMETER WITH THE POWER SHAFT
OF A MOTOR VEHICLE
Filed Oct. 30, 1922 2 Sheets-Sheet 2
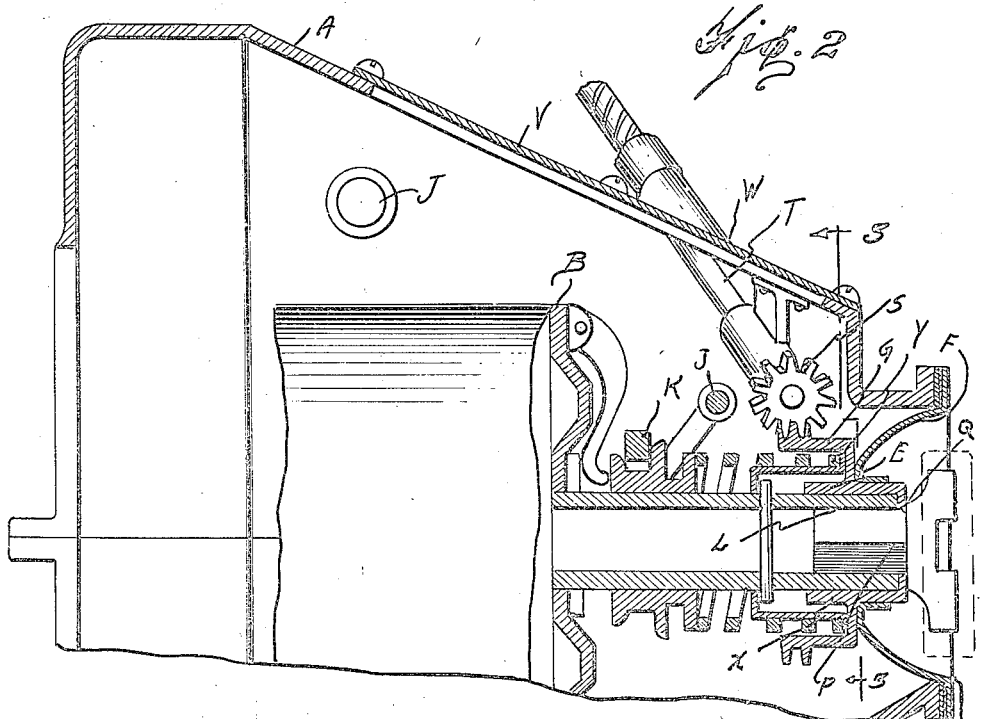
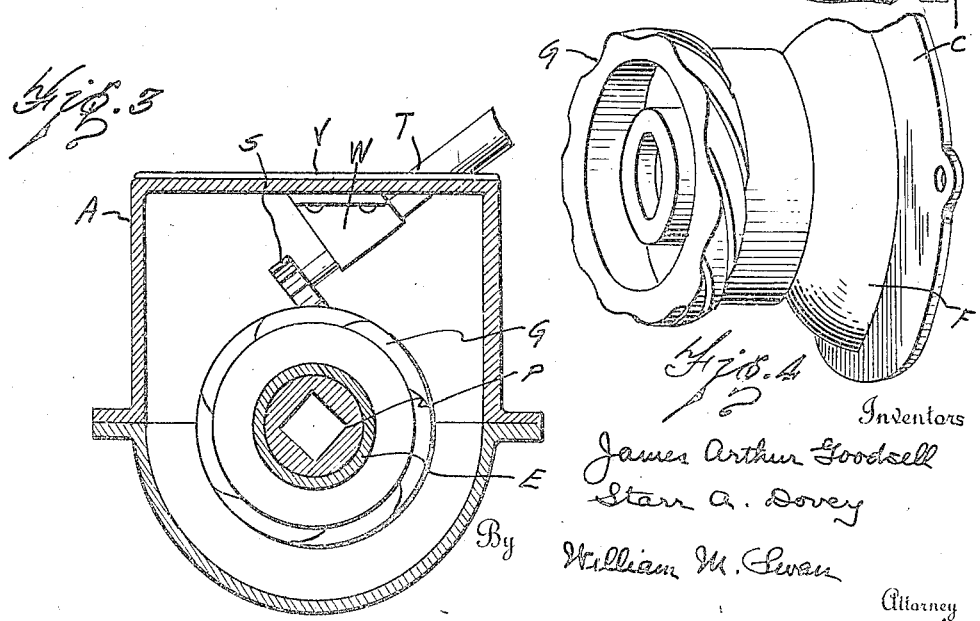
Inventors
James Arthur Goodsell
Starr A. Dovey
By William M. Swan
Attorney Patented Nov. 13, 1923.

1,473,988

UNITED STATES PATENT OFFICE.

JAMES ARTHUR GOODSELL AND STARR A. DOVEY, OF HUDSON, MICHIGAN.

MECHANISM FOR CONNECTING THE SPEEDOMETER WITH THE POWER SHAFT OF A MOTOR VEHICLE.

Application filed October 30, 1922. Serial No. 597,777.

*To all whom it may concern:*

Be it known that we, JAMES ARTHUR GOODSELL and STARR A. DOVEY, citizens of the United States, residing at Hudson, county of Lenawee, State of Michigan, have invented a certain new and useful Improvement in Mechanism for Connecting the Speedometer with the Power Shaft of a Motor Vehicle, and declare the following to be a full, clear, and exact description of the same, such as will enable others skilled in the art to which it pertains to make and use the same, reference being had to the accompanying drawings, which form a part of this specification.

This invention relates to mechanism for connecting the speedometer of a motor vehicle directly with the power shaft, and has for its object not only the avoidance of positioning the take-off gear wheel on the axle of the forward traction wheels where they are likely to become clogged with mud, but as well the adaption of this construction to use on vehicles which employ a planetary type of power axle transmission, without reliance upon a supplemental or jack shaft within the gear case, whose inclusion would be impossible without an entire change in the shape thereof.

In the drawings:

Figure 1 is a perspective view of a planetary transmission housing and some of the included parts which relate to our invention.

Figure 2 is a vertical section through the axial center of the parts.

Figure 3 is a vertical section taken along the line 3—3 of Figure 2 and looking in the direction of the arrows there shown.

Figure 4 is a perspective view on a somewhat larger scale than Figure 1, showing the worm gear piece and the cupped half of the universal joint housing disassociated from the other parts.

The location of the take-off gear for a speedometer on the front axle of a motor vehicle has proved objectionable because of its clogging with mud, becoming jammed as a result of relatively harmless collisions, etc., and has heretofore directed the efforts of inventors toward locating this member, suitably proportioned as to its size, in some such relatively protected and enclosed position as the interior of the transmission housing. The objection to all forms of this with which we are familiar, has been that the apparently necessary addition of a jack shaft or similar mechanism to one side of the main shaft has made the bulk or contour of the then completed mechanism such that the ordinarily provided housing would no longer fit thereover; and moreover these efforts have been directed to the relatively large and expensive cars which employ sliding gear transmissions, whereas our invention is especially adapted to the cars which still employ the planetary gear transmission system, of which the well-known Ford car is the most conspicuous example. Our invention when installed on a standard transmission of this type permits its enclosure in the same shaped and sized housing that is regularly furnished, and with the very slight modification of two of the parts, operatively accommodates the mechanism to the additional structural and operative part which we introduce to secure the results desired.

A represents the housing shell for the planetary transmission B, one end of the shell through which the shaft engages being closed by the centrally bored and sleeved half C of the universal joint housing, which is attached at its edges to the adjacent edges of the shell A by the bolts or screws D, so that its concaved or dished portion extends inwardly with respect to the shell A. As brought out particularly in Figures 1 and 4, the shaft bore is surrounded by a sleeve or chimney E, which not only reaches slightly into the bowl or cupped portion F, but also extends inwardly, there to be annularly engaged by, and serve as a support for, the body of the peripherally wormed gear G, which is adapted to be rotatively actuated by the planetary transmission mechanism B, the shaft L of which has its outer end provided with the squared bore P (see Figures 1 and 3), in which the correspondingly shaped entering end Q of the universal joint R engages. The lengthwise actuation of the planetary gear mechanism B in the usual manner through the medium of the yoke K, which is supported from the rock shaft J, actuated from without by the lever M, is unchanged from the present practice, so neither its operation nor the details of the planetary transmission mechanism need be gone into in further detail.

The threads of the worm G have in operative engagement with them the teeth of the gear S, whose shaft T is rotatably mounted in a suitable bearing W in the top closure plate V of the housing A, which may be connected as desired with one end of the shafting, flexible or otherwise, by which the rotative movement thus imparted is communicated to the speedometer on the dash of the vehicle. And, as brought out particularly in Figure 1 the body of the worm gear G is preferably provided with a sleeve projection X, so spaced from its main body portion as to permit the fitting thereinto of the end Y of the planetary gear mechanism B. The worm gear G is thus effectively fitted in as an integral part of the standard planetary gear mechanism, and with proper proportioning of the gear wheel S to the speedometer parts on the dash, effectively and accurately communicates thereto the vehicle's speed variations, while thoroughly protected from mud or other clogging or injuring media.

What we claim is:

1. In combination with a planetary transmission mechanism, a detachable end closure for the enclosing shell thereof closure coaxially disposed with respect to the shaft of said planetary transmission mechanism, a rotatable sleeve provided with a peripheral worm gear clearingly engaging about the end of said planetary transmission mechanism within said coaxially disposed end closure, and a gear wheel operatively connected with an external member and rotatively supported in position for its teeth to be engaged by the worm on said sleeve.

2. An enclosed speedometer connection with the planetary gear mechanism of a motor vehicle, comprising a standard enclosing shell, a gear wheel provided with an externally extending shaft rotatably supported by said shell, and a worm gear member disposed within said shell about the end of the planetary gear mechanism, said worm gear having a relatively elongated sleeve one end of which engages about the end of the power shaft and the other end of which engages about the adjacent end of the universal joint.

3. In combination with a planetary gear mechanism and a housing shell of similar dimensions at its points of potential connection and operative function to that customarily furnished, a power shaft regulatably connectible with said planetary gear mechanism, a worm gear having an elongated sleeve engaging about said power shaft and planetary gear mechanism respectively and adapted to rotate therewith, and means rotatably supported by said housing shell in position to transmit to an outside member the rotative movement of said worm gear.

In testimony whereof we sign this specification in the presence of two witnesses.

JAMES ARTHUR GOODSELL.
STARR A. DOVEY.

Witnesses:
WILLIAM M. SWAN,
JEFFERSON C. THURBER.